Oct. 4, 1960 M. J. H. STAAR 2,954,930

PHONOGRAPHIC APPARATUS

Filed Nov. 15, 1955

Inventor:
Marcel Jules Helene Staar.

By. Carlson, Pitzner, Hubbard & Wolfe
Attys.

2,954,980
Patented Oct. 4, 1960

2,954,980

PHONOGRAPHIC APPARATUS

Marcel Jules Helene Staar, 30 Square du Solbosch, Brussels, Ixelles, Belgium

Filed Nov. 15, 1955, Ser. No. 546,863

Claims priority, application Belgium Nov. 16, 1954

4 Claims. (Cl. 274—1)

The present invention relates to phonographic apparatus as employed in the reproduction of recorded music from records and more particularly to cleaning devices for the styli of the pickup cartridge mounted in the tone arm of such apparatus.

It is an object of the present invention to provide means permanently mounted on the phonographic apparatus proximately to the pickup cartridge styli to facilitate cleaning the styli by the removal of dust and dirt accumulations therefrom.

It is a further object to provide cleaning devices for the multiple styli of a turn over pickup cartridge, located on the phonographic apparatus in such a manner as to reach the inaccessible and protected styli of the pickup cartridge, and thus dispense with the need for periodic and inconvenient hand cleaning of the styli.

The styli of phonographic reproducing apparatus are fouled as the result of playing old, dusty or dirty records or from the natural accumulation of foreign matter through extended periods of nonuse. The frequency with which styli require cleaning depends on many factors, nonetheless for highest fidelity and to lengthen record and styli life frequent periodic cleaning of the styli is necessary. Dirt and dust particles act as an abrasive between the styli and the record grooves, and continued playing of records with dirty or dusty styli has the effect of shortening the record life by wearing unduly the grooves and prematurely dulling the styli. It is therefore an object of the present invention to lengthen both styli and record life by providing means enabling the frequent and easy cleaning of the tone arm styli.

The objects of the invention thus generally set forth together with other objects and ancillary advantages are obtained by the construction and arrangement shown by way of illustration in the accompanying drawings, in which.

Figures 1, 2, 3, 4, 5, 6, 7, 8:
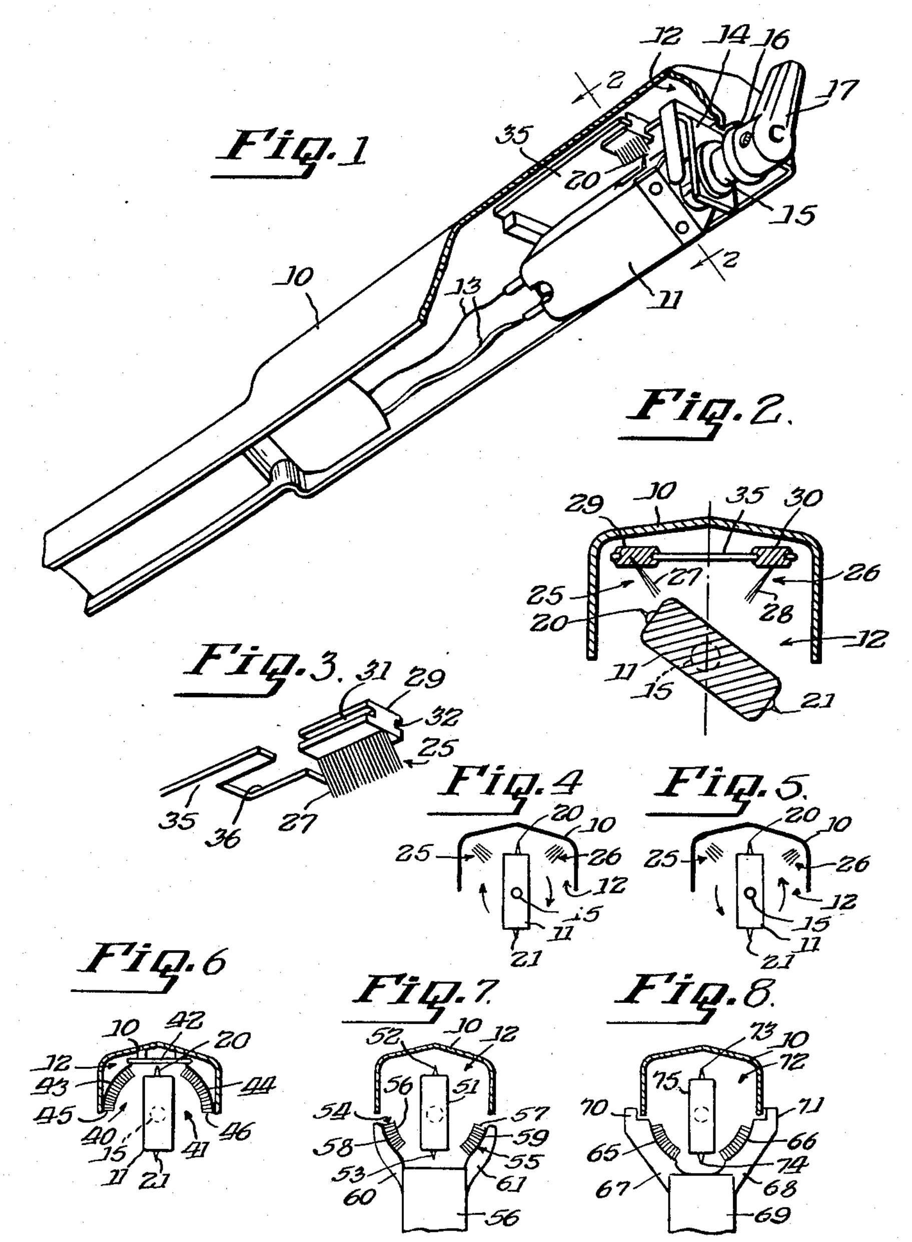
Figure 1 is a perspective view of a tone arm provided with a turn over pickup cartridge and cleaning devices for the styli constructed and arranged in accordance with an illustrative form of the present invention.
Fig. 2 is a section taken substantially in the plane of line 2—2 in Fig. 1.
Fig. 3 is a fragmentary perspective exploded view of one of the brush cleaning devices as shown in Fig. 1, and the support therefor.
Figs. 4 and 5 are diagrammatic views illustrating the turn over cartridge and styli with which the tone arm in Fig. 1 is provided.
Fig. 6 is a diagrammatic view illustrating a modification of the styli cleaning means.
Figs. 7 and 8 are diagrammatic views illustrating further modifications thereof.

While the invention is susceptible of various modifications and alternative constructions there is shown in the drawings and will herein be described in detail, an illustrative embodiment, but it is to be understood that it is not thereby intended to limit the invention to the specific form disclosed, but on the contrary it is intended to cover all modifications, alternative constructions and equivalents falling within the spirit and scope of the invention as expressed in the appended claims.

Referring more particularly to the drawings, there is shown in Figs. 1 through 5, a tone arm as employed in phonographic apparatus for the reproduction of recorded music from records. In general, the tone arm is formed of a channel member 10 which may be plastic, metal or the like, and which is equipped with a conventional turn over cartridge 11 mounted for rotation in the tone arm head 12. Electrical connections or leads 13 are illustrated fastened to the cartridge 11 and extending through the tone arm for attachment to the amplifier and speaker system of the phonographic apparatus.

For purposes of clarity, in Fig. 1, one wall of the channel member forming the tone arm is broken away so that the construction and arrangement of the parts making up this apparatus is open to view, and it will be observed the pickup cartridge 11 is mounted by means of a bracket 14 in the tone arm head 12 and has a forwardly projecting spindle 15 passing through an opening 16 pierced in the front of the tone arm head 12. For convenience in rotating the turn over cartridge 11 to change the stylus a short radially extending arm or lever 17 is fastened to the spindle 14.

As can be seen in Fig. 2, the turn over cartridge 11 is provided with multiple styli, 20, 21 arranged on opposite sides of the cartridge for contact with records carried on the usual turntable. To position one stylus for contact with a record, the turn over cartridge 11 is rotated by means of the arm 17 to a vertical position, as shown in Figs. 4 and 5, two styli being normally provided for records adapted to be played at different turntable speeds, and having grooves of different widths. Thus the styli 20, 21 may be of different over-all dimensions, as is well known in the art, to permit playing of records recorded at 33 r.p.m., 45 r.p.m., or 78 r.p.m, conventional record speeds. Normally, one stylus is provided for playing records recorded at 45 r.p.m. and 33 r.p.m., while the other stylus is provided for playing records recorded at 78 r.p.m.

In an exemplary form of the invention, the tone arm incorporates an improved construction and arrangement of components facilitating the cleaning of the styli carried by the pickup cartridge upon rotation of the pickup cartridge to position one stylus or the other below the tone arm head to play a record carried on the turntable. By means of the improved construction and arrangement, as the pickup cartridge 11 is rotated by means of the arm 17, one stylus or the other is passed through the bristles of a brush permanently mounted in the tone arm head 12 proximately to the pickup cartridge.

In the present instance, as shown in Fig. 2, a pair of brushes 25, 26 is mounted in the tone arm head 12 adjacent to the pickup cartridge 11. More particularly, the brushes 25, 26 are constructed of bristles 27, 28 supported by brush heads 29, 30 provided along each edge with grooves 31, 32 (Fig. 3) to facilitate fastening the brushes in place on a plate 35 rigidly mounted within the tone arm head 12. The brush heads are adapted to be inserted within slots 36 in the outer end of the plate 35, the edges of the slots 36 interengaging with the grooves 31, 32 in the edges of the brush heads and forming tongue and groove connections therebetween to provide a rigid and secure fastening means for the brush heads. Two similar slots 36 are cut in the plate 35 to accommodate the pair of brushes 25, 26 both of which are similarly formed with parallel rows of bristles 27, 28, although additional brushes may be incorporated as desired. With brushes on either side of the cartride, as shown in Fig. 2, upon rotative movement of the pickup cartridge 11, both styli are caused to pass through the bristles of a brush mounted within the tone arm head 12.

Thus by means of cleaning devices permanently mounted in the tone arm head, accumulations of dust and dirt which collect upon the stylus of the pickup cartridge may be removed upon rotation of the pickup cartridge. It is obvious that cleaning of the styli may be accomplished simply by rotating the pickup cartridge, although no need arises to change the stylus for playing records at different speeds, and the pickup cartridge may be rotated solely for the purpose of brushing foreign matter from the stylus and consequently effecting cleaning thereof.

By providing a pair of similar spaced and facing brushes 25, 26 mounted in the tone arm head 12, above and adjacent to the turn over cartridge 11 as shown in Figs. 4 and 5, rotation of the cartridge in either a clockwise or counterclockwise direction is effective to bring the upwardly directed stylus into contact with the bristles of one of the brushes, while the other stylus is brought into contact with the bristles of the second brush. The dual or companion arrangement of the brushes in proximate relation to the pickup cartridge insures that each time the stylus is changed, both styli are subjected to the cleaning operation.

In another aspect of the invention, illustrated in Fig. 6, the brushes may be of arcuate form rather than comprising single or multiple rows of bristles as shown in Figs. 1–3. In a manner similar to the construction and arrangement there shown, the brushes 40, 41 of arcuate form, illustrated in Fig. 6, are mounted by means of a bracket 42 fastened within the head 12 of the tone arm. Thus upon either clockwise or counterclockwise rotation of the pickup cartridge 11, both styli are brought into contact with a brush within the tone arm head and adapted to clean accumulations of dirt and dust therefrom. In this aspect of the invention, the brush heads 43, 44 are formed arcuately corresponding to the arc traveled by the styli upon rotation of the pickup cartridge. Bristles 45, 46 carried substantially over the entire surface of the brush head form an arcuate brush likewise corresponding to the arc traveled by the styli upon rotation of the pickup cartridge, and provide an effective and long life brush for cleaning the styli. As in the manner previously described, by having brushes adjacent to and on either side of the pickup cartridge, the styli are cleaned upon either clockwise or counterclockwise rotation of the pickup cartridge.

Another modification of the invention is illustrated in Fig. 7, where there is shown diagrammatically, a tone arm head 12, having mounted therein a turn over cartridge 51 provided with oppositely disposed styli 52, 53. The pickup cartridge 51 again is of the turn over type in order to enable the different styli 52, 53 to be brought into position to contact records recorded for playing at different speeds and supported for rotation on a turntable. In this form of the invention, in place of having the brushes mounted within the head of the tone arm, the brushes 54, 55 are permanently mounted on the phonographic apparatus, in the present instance upon the rest 56 for the tone arm. The brushes 54, 55 are of arcuate form and have bristles 56, 57 extending from and supported by brush heads 58, 59. For convenience, the brush heads are each provided with an arm, 60, 61 adapted to be fastened in any desired manner to the rest 56 for the tone arm. The brush heads 58, 59 are so located as to support the bristles in proximate relation with the pickup cartridge 51 when the tone arm is supported on the rest 56. Further, the brush heads 58, 59 are arcuate in form corresponding to the arc traveled by the styli upon rotation of the cartridge 51, although it will be understood modification of the form of the brushes may be effected, as desired.

As in the illustrative embodiment of the invention shown in Figs. 1 through 5 and described hereinbefore, a pair of like brushes is employed so that both styli carried by the pickup cartridge are brought into contact for cleaning purposes, with a brush upon either clockwise or counterclockwise rotation of the pickup cartridge.

In order that the brush heads themselves may form a rest for the tone arm, a further exemplary form of the invention, as shown in Fig. 8 the brush heads 65, 66 are are supported by means of arms 67, 68 on a post 69 carried by the phonographic apparatus. To provide a seat for the tone arm, the arms 67, 68 may be provided with notched upwardly extending projections 70, 71 conformed to the tone arm head 72. A pair of spaced arcuate brushes facing inwardly and carried by the brush heads 65, 66 respectively, in this embodiment of the invention, is provided for engagement with the styli 73, 74 supported by the turn over cartridge 75 mounted within the tone arm head 72. The similar and opposite facing arrangement of the brushes, enables the styli carried by the turn over cartridge to be brushed upon either clockwise or counterclockwise rotation of the cartridge, and thus automatically the styli are cleaned as the turn over cartridge is rotated to change the stylus to play records recorded at different playing speeds. It will be apparent also that the styli may be cleaned merely by rotating the turn over cartridge, or by swinging the styli back and forth as by oscillating the turn over cartridge, for cleaning purposes, although no need arises for changing the stylus to accommodate for changing record playing speed.

From the foregoing it will be apparent that a tone arm constructed and arranged in accordance with the teachings of the present invention permits of ready and easy cleaning of the styli carried by the pickup cartridge. The styli may be cleaned by rotating the turn over cartridge, as normally occurs with the operation of multiple speed phonographic apparatus when changing the stylus to play records recorded at different playing speeds, or may be cleaned by rotating the turn over cartridge to bring the styli in contact with the cleaning devices although no need arises to change the stylus for different records.

It is also to be noted that the foregoing construction and arrangement is of relatively inexpensive form requiring a minimum number of individual components and is simple of manufacture and installation. The brush assembly is rugged, and may be made of minimum size, and used with a standard tone arm head provided with a conventional turn over cartridge.

I claim as my invention:

1. In a phonograph apparatus having a tone arm and a tone arm rest, said tone arm being movable from a position on said rest to a playing position, the combination comprising, a pickup cartridge with multiple styli movably mounted on the tone arm head, and means for cleaning accumulations of dirt and dust from the styli when the tone arm is positioned on said rest including a brush fixedly supported by said apparatus adjacent said pickup cartridge for engagement by the styli upon movement of said cartridge to change styli.

2. In a phonograph apparatus having a tone arm and a tone arm rest, said tone arm being movable from a position on said rest to a playing position, the combination comprising, a pickup cartridge with multiple styli movably mounted on the tone arm head, and means for cleaning accumulations of dirt and dust from the styli when the tone arm is positioned on said rest including a brush fixedly supported by said tone arm rest adjacent said pickup cartridge for engagement by the styli upon movement of said cartridge when said tone arm is so positioned.

3. In a phonographic apparatus having a tone arm, a tone arm rest, and a turn over pickup cartridge with multiple styli rotatably mounted in the tone arm head, means for cleaning accumulations of dirt and dust from the styli when the tone arm is positioned on the tone arm rest, said means comprising upwardly extending spaced facing brush heads supported on said tone arm rest, said brush heads being arcuately curved corresponding to the arc traveled by said styli upon rotation of said turn over cartridge and forming spaced facing brushes for engagement by the styli upon rotation of said turn over cartridge in either clockwise or counterclockwise direction.

4. In a phonographic apparatus having a tone arm, the combination comprising, a pickup cartridge with multiple styli rotatably mounted in the tone arm head, and means for cleaning accumulations of dirt and dust from the styli comprising arcuate brushes supported in said tone arm head adjacent to said cartridge for engagement by said styli upon rotation of said cartridge, the arcuate form of said brushes corresponding to the arc traveled by said styli upon such rotation of the cartridge.

References Cited in the file of this patent

UNITED STATES PATENTS

| | | |
|---|---|---|
| 1,836,591 | Hall | Dec. 15, 1931 |
| 2,444,484 | Wise | July 6, 1948 |
| 2,645,498 | Miller | July 14, 1953 |
| 2,670,213 | Zimmerman | Feb. 23, 1954 |
| 2,685,447 | Ristau et al. | Aug. 3, 1954 |